United States Patent [19]

Mallikarjun et al.

[11] Patent Number: 5,442,041

[45] Date of Patent: Aug. 15, 1995

[54] REMOVAL OF VOLATILE SUBSTANCES FROM THERMOPLASTIC RESINS

[75] Inventors: Ramesh Mallikarjun, Exton; Leon L. Otte, Newtown Square; William J. Cleland, Thorndale, all of Pa.

[73] Assignee: ARCO Chemical Technology, L.P., Greenville, Del.

[21] Appl. No.: 374,051

[22] Filed: Jan. 19, 1995

[51] Int. Cl.$^6$ .................................................. C08F 6/00
[52] U.S. Cl. ....................... 528/483; 264/101; 521/79; 521/92; 521/97; 528/480; 528/488
[58] Field of Search ............ 528/480, 483, 488; 521/79, 92, 97; 264/101

[56] References Cited

U.S. PATENT DOCUMENTS

| | | | |
|---|---|---|---|
| 4,588,754 | 5/1986 | Liu | 521/92 |
| 4,695,594 | 9/1987 | Pressman | 521/92 |
| 4,703,105 | 10/1987 | Allada | 528/483 |
| 4,940,472 | 7/1990 | Hay, II et al. | 55/195 |
| 4,940,472 | 7/1990 | Hay, II et al. | 55/195 |
| 4,952,672 | 8/1990 | Moore et al. | 528/501 |
| 4,994,217 | 2/1991 | Banevicius et al. | 264/45.9 |
| 5,102,591 | 4/1992 | Hasson et al. | 264/45.9 |
| 5,204,410 | 4/1993 | Banevicius et al. | 525/132 |

OTHER PUBLICATIONS

Heck et al., "Blowing Agents," *Encyclopedia of Polymer Science & Technology* vol. 2, pp. 438–443.
Hurnick "Chemical Blowing Agents", *Plastics Additives Handbook*, 3rd Edition, Chapter 16, pp. 811–832 (1990).
"Update: Blowing Agents", *Plastics Compounding*, pp. 64–72, (1980).

*Primary Examiner*—Morton Foelak
*Attorney, Agent, or Firm*—Stephen D. Harper

[57] ABSTRACT

A thermoplastic resin such as a styrene/maleic anhydride copolymer is treated to remove volatile impurities such as unreacted styrene by admixing with a chemical blowing agent and extruding under a vacuum. The chemical blowing agent is converted into an inert gas such as carbon dioxide during extrusion; the gas evolved is removed, together with the volatile impurities, through one or more vents in the extruder. The use of a chemical blowing agent, rather than the inert gas itself, permits the facile distribution of the $CO_2$ stripping agent throughout the molten thermoplastic resin using commonly available extruders without the need for elaborate gas injection means.

12 Claims, No Drawings

REMOVAL OF VOLATILE SUBSTANCES FROM THERMOPLASTIC RESINS

FIELD OF THE INVENTION

This invention relates to the removal of volatile substances from thermoplastic resins. More particularly, the present invention pertains to methods for reducing the concentration of volatile residues such as unreacted monomer from thermoplastic resins such as styrenic resins by extruding said resins in a vented extruder under subatmospheric pressure together with a chemical blowing agent capable of conversion to an inert gas such as carbon dioxide.

BACKGROUND OF THE INVENTION

In manufacturing thermoplastic resin compositions, it is well known that free, unpolymerized monomer often remains absorbed within the thermoplastic resin produced due to the fact that complete monomer polymerization (particularly monomers such as styrene) is impractical to achieve on an industrial scale. Additionally present may be minor amounts of other organic species such as solvents, oligomers, catalyst, or volatile condensation products. Such substances may be detrimental to the ultimate product formed from the thermoplastic resin by reason of off-taste, off-odor, toxicity, or degradation of physical properties via plasticization, depolymerization, and so forth. Additionally, it is expected that government regulatory agencies may eventually establish maximum permissible levels of various monomers, including styrene, in packaging materials intended to contact food, beverages, pharmaceuticals, and cosmetics on the ground that excess levels represent an unacceptable health risk.

U.S. Pat. Nos. 4,940,472 (Hay et al.) and 4,952,672 (Moore et al.) disclose centrifugal devolatilizers which remove volatiles such as unreacted monomer from a variety of polymer products. The patents suggest the use of carbon dioxide added to the polymer to provide a stripping action, but fail to describe how the carbon dioxide could be effectively introduced. Moreover, such centrifugal devolatilizers are not in widespread commercial use; utilization of such equipment to remove monomeric residues from thermoplastic resins would require substantial capital investment by the plastics industry.

U.S. Pat. No. 4,703,105 (Allada) discloses the extraction of residues from molten styrenic polymers using a solvent gas such as carbon dioxide at near critical to supercritical conditions. According to the patent, the process may be conducted by bubbling or sparging the gas through the polymer contained in an extruder. Uniform, rapid diffusion of a gas throughout a molten polymer is required into order to maximize the efficiency of the residue extraction, yet is quite difficult to accomplish in the absence of highly sophisticated and expensive processing equipment.

U.S. Pat. No. 5,204,410 (Banevicius et al.) teaches that volatile substances in polyphenylene ether/polystyrene compositions are substantially reduced by extruding the resins in a single pass using a plurality of stages comprising injection of a stripping agent (preferably water) and vacuum venting. While the patent suggests that carbon dioxide could be used as the stripping agent instead of water, it does not indicate how a substance such as $CO_2$, which is much more volatile than water, could successfully be introduced into such compositions to efficiently remove the impurities present.

Thus, there exists a great need to develop an effective technique for reducing the level of volatile impurities in thermoplastic resins which is readily capable of adaptation to existing resin processing equipment.

SUMMARY OF THE INVENTION

This invention provides a method of reducing volatile residue levels in a thermoplastic resin. Such method comprises delivering the thermoplastic polymer and a chemical blowing agent capable of generating an inert gas (preferably, carbon dioxide) upon heating to an extruder equipped with at least one vent. The admixture of these materials is extruded while applying a vacuum at said vent or vents at a temperature effective to convert the chemical blowing agent to the inert gas, thereby forming a purified polymeric composition which is thereafter recovered in solid unfoamed form.

DETAILED DESCRIPTION OF THE INVENTION

Thermoplastic resins useful in the present invention are the high polymeric substances that soften or melt when exposed to heat and return to their original solid condition when cooled to room temperature and may constitute homopolymers or copolymers. It is particularly preferred that the resins are ones which customarily contain free styrene monomer and contain at least about 10 percent by weight of polymerized styrene together, optionally, with one or more copolymerized comonomers such as, for example, styrene/maleic anhydride (SMA resins), styrene/methacrylic acid, acrylonitrile/butadiene/styrene (ABS resins), styrene/acrylonitrile (SAN resins), polystyrene, and high impact polystyrene (HIPS resins). Such thermoplastic resins are referred to herein as styrenic resins. The styrenic resin may comprise, in polymerized form, monovinylidene aromatic hydrocarbon monomers other than styrene such as alpha methyl-styrene, para t-butyl styrene, halogenated styrenes and the like. Especially suitable for use are copolymers of styrene and maleic anhydride containing from 0.1 to 30 weight percent polymerized maleic anhydride such as the "Dylark" resins sold commercially by ARCO Chemical Company.

Thermoplastic resins within the scope of this invention may also contain an elastomer in the form of a synthetic or natural rubber component such as polybutadiene, polyisoprene, neoprene, nitrile rubbers, styrene-butadiene copolymers (block or random), acrylonitrile-butadiene copolymers, ethylene-propylene copolymers, ethylene-propylene-diene terpolymers, chlorinated rubbers, etc. which are used to strengthen or toughen such resins. This rubber component may be incorporated into the thermoplastic resin by any of the methods well known to those skilled in the art, e.g., solution, mass or emulsion graft polymerization of at least some of the monomers of the thermoplastic resin in the presence of the rubber and subsequent blending of the grafted rubber and optionally additional matrix polymer by solution or melt blending techniques; or merely blending by such techniques the rubber and the styrenic resin. Especially preferred are polyblends derived by the first technique. Generally, the rubber component may comprise from 0 to about 25% and preferably from 5 to about 10% by weight of the thermoplastic resin.

Any of the other known thermoplastic resins capable of being extruded may also be processed in accordance with the present invention in order to reduce the concentration of volatile impurities contained therein. Suitable thermoplastic resins include, but are not limited to, polycarbonate, polycarbonate blends such as polycarbonate/ABS, polyphenylene ethers, polyphenylene ether blends such as polyphenylene ether/polystyrene (sold under the name "Noryl" by General Electric Co.) polyolefins such as polyethylene and polypropylene, and the like.

In the process of this invention, it has been discovered that the use of a chemical blowing agent as a source of an inert gas such as carbon dioxide during extrusion of a thermoplastic resin is an effective and convenient method for lowering the concentration of volatile organic substances such as unreacted monomer. In general, substances having molecular weights less than about 400 and/or boiling points at atmospheric pressure less than about 250° C. may be removed to a significant degree from thermoplastic resins using the present invention. Without wishing to be bound by theory, it is believed that such reduction is facilitated by the ease with which the chemical blowing agent may be intimately combined with the thermoplastic resin during a pre-extrusion dry or tumble blending step or during the extrusion process itself. An advantage of the present invention is that the use of a chemical blowing agent permits a reduction in the number of ampere hours required to extrude the thermoplastic resin. It is believed that this effect is attributable to plasticization of the thermoplastic resin by the chemical blowing agent and/or the inert gas (e.g., $CO_2$) generated therefrom. Another advantage is that an extrusion step is typically practiced at some point during the course of existing thermoplastic resin manufacturing operations; adoption of the present invention thus would not require extensive retrofitting or replacement of present facilities.

Any of the chemical blowing agents capable of being converted to an inert gas upon application of heat may be employed. The gas evolved should be thermally stable, should not react with the thermoplastic resin, and should be a substance such as carbon dioxide, nitrogen, or the like which exists in vapor form at room temperature (25° C.) and atmospheric pressure. Preferably, both the chemical blowing agent and the inert gas are odorless, nontoxic, noncorrosive, and nonflammable. Such chemical blowing agents are well-known and are also readily available from commercial sources. For example, the chemical blowing agents sold by B.I. Chemicals, Inc. under the name "Hydrocerol" may be used to advantage. Other sodium bicarbonate-containing blowing agents, which often are formulated with an organic acid such as citric acid or esters thereof, may also be employed. Blends comprised of 10 to 90 weight percent citric acid and 10 to 90 weight percent sodium bicarbonate can be used, for example. The chemical blowing agent thus may be selected from the group consisting of sodium bicarbonate, citric acid, and mixtures thereof. The chemical blowing agent may, if so desired, be selected so as to generate water, nitrogen, or the like in addition to carbon dioxide upon decomposition since such substances will, under the process conditions, also tend to act as stripping agents and assist in the removal of volatile impurities from the thermoplastic resin. It is highly desirable to select a chemical blowing agent which will liberate the desired inert gas at the temperature which the thermoplastic resin experiences during extrusion, which typically is from about 200° C. to 300° C. The onset of chemical blowing agent decomposition may, however, be significantly lower than the extrusion temperature (for example, 100° C. to 200° C.) without adverse effect on the level of volatile residue reduction achieved.

Where the chemical blowing agent functions as a source of $CO_2$, the process of this invention may be operated such that the liberated carbon dioxide is maintained in the supercritical state for at least a portion of the extruder residence time of the molten thermoplastic resin. The critical point for carbon dioxide is approximately 1000 psi and 30° C.; the extruder and screw design and extrusion conditions may accordingly be selected to assure the formation of supercritical carbon dioxide capable of providing good stripping action in the resin.

The chemical blowing agent may be combined with the thermoplastic resin in any suitable physical form such as, for example, solid powder, pellets, granules, a dispersion in an inert liquid or with a diluent such as silica or clay, or as a concentrate in a carrier polymer. Most preferably, however, the particle size of the chemical blowing agent is sufficiently small to facilitate uniform blending with the thermoplastic resin. Generally, an average particle size of less than 100 microns is preferred. If the thermoplastic resin being treated in accordance with the present invention is coming directly from a polymerization reactor, it will typically be desirable to first remove most of the solvent, unreacted monomer, water, and other volatile components by preliminary processing such as conventional devolatilization or filtration techniques. The thermoplastic resin thus will ordinarily have total volatile residue levels ranging from 500 to 10,000 ppm prior to treatment with the chemical blowing agent. The resin feed maybe in solid particulate form (e.g., pellets, powder, beads, flakes, or reground material) or in liquid (molten) form.

The amount of chemical blowing agent employed should be sufficient to effect at least partial removal of the volatile residues in the thermoplastic resin during practice of the process of this invention. The optimum amount of chemical blowing agent will vary somewhat depending upon the level of impurities in the thermoplastic resin, the gas yield of the chemical blowing agent (which preferably is in the range of from 100 to 300 cubic cm per gram), processing temperature and pressure, extruder design and other factors, but generally will be in the range of from about 0.5 to 10 weight percent based on the weight of the thermoplastic resin. Preferably, at least 1 weight percent chemical blowing agent is utilized.

While the manner in which the thermoplastic resin and chemical blowing agent are admixed is not critical, it is preferred to dry blend the components in advance of extrusion such that the chemical blowing agent is uniformly distributed through the thermoplastic resin (which typically is in particulate form). Alternatively, the components may be combined by separately feeding the chemical blowing agent and thermoplastic resin to the extruder such that mixing takes place in the extruder itself.

The chemical blowing agent may be introduced stepwise using, for example, multiple feed ports on the extruder.

An essential step in the method of this invention is extruding the thermoplastic resin together with the chemical blowing agent in an extruder equipped with at least one vent (preferably, a plurality of vents). The extrusion temperature is such as to effect decomposition of the chemical blowing agent to inert gas. A vacuum is applied to the vent or vents during extrusion such that the liberated inert gas is removed from the thermoplastic resin together with at least a portion of the volatile residues.

Extrusion may be conducted using any known equipment for this operation, including single-screw and multiple screw extruders. A twin screw extruder is especially suitable for the removal of volatile impurities in accordance with the present invention. Suitable extruders include those incorporating one or more screws rotating in a horizontal cylindrical barrel with an entry port mounted over one end and a shaping die mounted at the discharge end. Additional feed parts may be positioned downstream of the first feed post.

The degree of vacuum applied to the vent or vents of the extruder will depend on several factors, including extrusion temperature, the proportion of volatile impurities in the thermoplastic resin, and the amount and type of chemical blowing agent to be employed. In general, pressures of from about 1 to 200 torr are preferred.

As the admixture of thermoplastic resin and chemical blowing agent is transported downstream within the extruder, the thermoplastic resin component (where initially in solid particulate form) is heated and melted by application of heat to the barrel of the extruder. Alternatively, the thermoplastic resin may be melted prior to combining with the chemical blowing agent within the extruder. For most thermoplastic resins, temperatures of from about 200° C. to 300° C. are sufficient for this purpose. If the thermoplastic resin to be purified is coming directly from a reactor wherein bulk or solvent polymerization has been performed, the resin may be maintained in the liquid state prior to and during extrusion. The vacuum vent or vents are preferably located at a point or points along the length of the extruder where at least a portion of the chemical blowing agent has undergone decomposition to carbon dioxide. The use of multiple vents is preferred in order to ensure that all of the inert gas is removed before the melt enters the extruder die and is pelletized so as to avoid forming pellets containing voids. More complete removal of volatile impurities from the thermoplastic resin is also favored by the utilization of multi-vent extruders. Multiple stage extruders or a series of individual extruders may be effectively employed when practicing the process of this invention. The purified polymeric composition exiting the extruder can be extruded into shapes or cut into pellets for further processing in accordance with conventional techniques. Any conventional hot or cold pelletizing or cutting system may be used to form pellets. Cold cutting systems include deicing, strand pelletizing and strand (forced conveyance) pelletizing systems. Hot cutting systems include water ring pelletizers, hot face pelletizers, underwater pelletizers and centrifuged pelletizers. The purified polymeric composition is recovered in solid unfoamed form (i.e., the purified polymeric composition's unexpanded, non-cellular, and non-porous and has a density near the maximum theoretically possible). The chemical blowing agent in the process of this invention thus is used to remove volatile impurities from the thermoplastic resin rather than for the conventional purpose of foaming or expanding the resin. For this reason, the extrusion conditions are selected so as to permit essentially all of the liberated inert gas to escape from the purified polymeric composition prior to cooling and recovery of the composition in solid form.

The thermoplastic resin, while being combined and extruded with the chemical blowing agent, can also be formulated with other ingredients in order to incorporate such ingredients into the purified polymeric composition. These ingredients may be selected from among the conventional materials and additives commonly employed in thermoplastic resins such as plasticizers, mold release agents, melt viscosity reducers, colorants, stabilizers, flame retardants, antioxidents, fillers, reinforcing agents, lubricants, fragrances, and so forth. Other resins may also be blended with the thermoplastic resin during the process of this invention.

EXAMPLES

Controlled experiments were conducted using a lab scale 34 mm American Leistritz counter-rotating twin screw extruder having a single vacuum vent. Dylark 480 resin, a copolymer of styrene and maleic anhydride available from ARCO Chemical Company having a residual styrene monomer level of 2304 ppm, was extruded using a flat 250° C. temperature profile both with and without a chemical blowing agent. Two types of chemical blowing agent were employed: Hydrocerol CF powder (onset of decomposition ca. 150° C.) and Hydrocerol LC 40C granules (onset of decomposition ca. 210° C.), both available from B. I. Chemicals Inc.

The results obtained (Table I) show the surprisingly enhanced reduction in residual styrene monomer levels which is realized when a chemical blowing agent is present during extrusion in combination with the application of vacuum to the extruder vent.

TABLE I

| Example No. | Wt % Chemical Blowing Agent | Vacuum Level, torr | Residual Styrene, ppm | % Reduction |
|---|---|---|---|---|
| 1* | 0 | no vacuum | 1803 | 22 |
| 2* | 0 | 50 | 1040 | 55 |
| 3* | 2[1] | no vacuum | 1112 | 52 |
| 4 | 2[1] | 50 | 555 | 76 |
| 5* | 2[2] | no vacuum | 1526 | 34 |
| 6 | 2[2] | 50 | 903 | 61 |

*comparative example
[1]Hydrocerol CF powder
[2]Hydrocerol LC 40C granules

Additional trials were performed using a 3½ inch Davis Standard single screw extruder equipped with a single vacuum vent section and a low shear PVC screw at different melt temperatures (screw speed=30 rpm). As shown in Table II, more effective removal of residual styrene monomer from Dylark 480 resin (2304 ppm styrene initially) was realized using the process of this invention than when chemical blowing agent was absent. The best results were obtained using the conditions of Example 10, wherein 90% of the residual styrene was removed from the styrenic resin as compared to only 59% when no chemical blowing agent was present (Example 8).

TABLE II

| Example No. | Wt % Chemical Blowing Agent | Vacuum Level, torr | Melt Temp., °C. | Residual Styrene, ppm | % Reduction |
|---|---|---|---|---|---|
| 7* | 0 | 150 | 260 | 1136 | 51 |
| 8* | 0 | 150 | 282 | 950 | 59 |
| 9 | 2[1] | 150 | 260 | 786 | 66 |
| 10 | 2[1] | 150 | 282 | 227 | 90 |
| 11 | 2[2] | 150 | 260 | 1039 | 55 |
| 12 | 2[2] | 150 | 282 | 792 | 66 |

*comparative example
[1] Hydrocerol CF powder
[2] Hydrocerol LC40C granules

We claim:

1. A method of reducing the level of volatile residues in a thermoplastic resin comprising the steps of:
   (a) delivering the thermoplastic resin and a chemical blowing agent capable of generating an inert gas upon heating to an extruder equipped with at least one vent;
   (b) extruding the thermoplastic resin and chemical blowing agent while applying a vacuum at said vent or vents at a temperature effective to convert the chemical blowing agent to the inert gas and remove said inert gas together with at least a portion of the volatile residues, thereby forming a purified polymeric composition; and
   (c) recovering the purified polymeric composition in solid unfoamed form.

2. The method of claim 1 wherein the thermoplastic resin is a styrenic resin.

3. The method of claim 1 wherein the chemical blowing agent is comprised of sodium bicarbonate.

4. The method of claim 1 wherein the chemical blowing agent is selected from the group consisting of citric acid, sodium bicarbonate, and mixtures thereof.

5. The method of claim 1 wherein the vacuum applied in step (b) is from 1 to 200 torr.

6. The method of claim 1 wherein the temperature in step (b) is from 200° C. to 300° C.

7. The method of claim 1 wherein from 0.5 to 10 weight percent chemical blowing agent based on the weight of thermoplastic resin is used in step (a).

8. The method of claim 1 wherein the purified polymeric composition is pelletized in step (c).

9. The method of claim 1 wherein the inert gas comprises carbon dioxide.

10. A method of reducing the level of volatile residues in a styrenic resin comprising the steps of:
    (a) delivering the styrenic resin and from 0.5 to 10 weight percent, based on the weight of the styrenic resin, of a chemical blowing agent selected from the group consisting of citric acid, sodium bicarbonate, and mixtures thereof to an extruder equipped with at least one vent;
    (b) extruding the styrenic resin and chemical blowing agent at a temperature of from 200° C. to 300° C. while applying a vacuum at said vent or vents of from 1 to 200 torr to convert the chemical blowing agent to carbon dioxide and remove said carbon dioxide together with at least a portion of the volatile residues, thereby forming a purified polymeric composition; and
    (c) recovering the purified polymeric composition in the form of solid unfoamed pellets.

11. The method of claim 10 wherein the styrenic resin comprises a copolymer of styrene and maleic anhydride.

12. The method of claim 10 wherein the volatile residues are comprised of styrenic monomer.

* * * * *